United States Patent
Noguchi et al.

(10) Patent No.: US 12,435,233 B2
(45) Date of Patent: Oct. 7, 2025

(54) ACTIVE ENERGY RAY CURING COMPOSITION, ACTIVE ENERGY RAY CURING INK COMPOSITION, ACTIVE ENERGY RAY CURING INKJET INK COMPOSITION, CONTAINER, IMAGE FORMING DEVICE, IMAGE FORMING METHOD, AND CURED MATTER

(71) Applicants: Soh Noguchi, Kanagawa (JP); Takashi Okada, Kanagawa (JP); Masahide Kobayashi, Kanagawa (JP)

(72) Inventors: Soh Noguchi, Kanagawa (JP); Takashi Okada, Kanagawa (JP); Masahide Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 637 days.

(21) Appl. No.: 17/810,384

(22) Filed: Jul. 1, 2022

(65) Prior Publication Data
US 2023/0018944 A1 Jan. 19, 2023

(30) Foreign Application Priority Data

Jul. 5, 2021 (JP) .................................. 2021-111640
May 17, 2022 (JP) .................................. 2022-080782

(51) Int. Cl.
*C09D 11/38* (2014.01)
*B41M 5/00* (2006.01)
(Continued)

(52) U.S. Cl.
CPC ........... *C09D 11/38* (2013.01); *B41M 5/0023* (2013.01); *B41M 7/0081* (2013.01); *C09D 11/101* (2013.01); *C09D 11/107* (2013.01)

(58) Field of Classification Search
None
See application file for complete search history.

(56) References Cited

U.S. PATENT DOCUMENTS

| | | | | |
|---|---|---|---|---|
| 6,638,995 B1 * | 10/2003 | Gelarden | ............ | C09D 11/106 523/160 |
| 7,261,407 B2 * | 8/2007 | Nishikawa | ............ | D06P 5/2005 347/100 |

(Continued)

FOREIGN PATENT DOCUMENTS

| | | | | |
|---|---|---|---|---|
| AU | 2011269186 A1 * | 10/2012 | ............ | B41J 2/2107 |
| CA | 2887113 A1 * | 4/2014 | ................ | C08F 2/44 |

(Continued)

*Primary Examiner* — Sanza L. McClendon
(74) *Attorney, Agent, or Firm* — Grüneberg and Myers PLLC

(57) ABSTRACT

An active energy ray curing composition can be applied to cured matter of a first active energy ray curing composition. The active energy ray curing composition contains a second active energy ray curing composition containing a monofunctional monomer, a polyfunctional monomer, and a photopolymerization initiator. The proportion of the polyfunctional monomer to the second active energy ray composition is 60 percent by mass or more. The proportion of the polyfunctional monomer modified with the same number of an oxyalkylene group as the number of functional groups of the polyfunctional monomer is 90 percent by mass of the polyfunctional monomer, and the proportion of a tri- or higher polyfunctional monomer is 50 percent by mass or more to the modified polyfunctional monomer.

8 Claims, 3 Drawing Sheets

(51) Int. Cl.
*B41M 7/00* (2006.01)
*C09D 11/101* (2014.01)
*C09D 11/107* (2014.01)

(56) References Cited

U.S. PATENT DOCUMENTS

| | | | |
|---|---|---|---|
| 7,578,587 B2 * | 8/2009 | Belelie | C09D 11/34 347/100 |
| 7,625,956 B2 * | 12/2009 | Odell | C09D 11/101 522/42 |
| 7,820,731 B2 * | 10/2010 | Odell | C09D 11/101 106/31.62 |
| 8,153,195 B2 * | 4/2012 | Tennis | C09D 133/14 522/64 |
| 8,933,141 B2 * | 1/2015 | Suzuki | C09D 11/101 522/182 |
| 11,117,391 B2 * | 9/2021 | Illsley | B41J 2/01 |
| 12,023,398 B2 * | 7/2024 | Yamaguchi | A61K 8/8194 |
| 2002/0182376 A1 * | 12/2002 | Mukherjee | B41M 5/506 428/32.24 |
| 2004/0201660 A1 * | 10/2004 | Nishikawa | B41J 2/2114 347/100 |
| 2006/0132566 A1 * | 6/2006 | Desie | C09D 11/101 347/100 |
| 2007/0076069 A1 * | 4/2007 | Edwards | B41J 11/00214 347/100 |
| 2012/0123014 A1 * | 5/2012 | Chretien | G03G 15/2098 522/182 |
| 2013/0004744 A1 * | 1/2013 | Kito | B41M 7/0045 522/18 |
| 2013/0230701 A1 * | 9/2013 | Mochizuki | C09D 11/30 522/16 |
| 2014/0364530 A1 * | 12/2014 | Lindekens | C09D 175/16 524/556 |
| 2019/0153267 A1 * | 5/2019 | Munnelly | B32B 27/283 |
| 2021/0061929 A1 | 3/2021 | Kobayashi et al. | |
| 2021/0102081 A1 | 4/2021 | Hiraoka | |
| 2021/0122938 A1 | 4/2021 | Kobayashi et al. | |
| 2021/0189157 A1 | 6/2021 | Yamaguchi et al. | |
| 2024/0417579 A1 * | 12/2024 | Karino | B32B 27/18 |

FOREIGN PATENT DOCUMENTS

| | | | | |
|---|---|---|---|---|
| CA | 2864077 C | * | 8/2017 | B05D 3/067 |
| CA | 2945805 C | * | 2/2019 | B29C 64/112 |
| EP | 2108683 B1 | * | 4/2017 | B41M 7/0027 |
| EP | 3415555 A1 | * | 12/2018 | B41J 2/01 |
| GB | 2551810 A | * | 1/2018 | B41J 11/0015 |
| JP | 2004-115655 | | 4/2004 | |
| JP | 2007-031667 | | 2/2007 | |
| JP | 2009209511 A | * | 9/2009 | B41J 2/2114 |
| JP | 2014-200988 | | 10/2014 | |
| JP | 2014198849 A | * | 10/2014 | |
| JP | 2014200988 A | * | 10/2014 | |
| JP | 6103213 B2 | * | 3/2017 | |
| JP | 2017180018 A | * | 10/2017 | |
| JP | 2019104866 A | * | 6/2019 | |
| JP | 2020023620 A | * | 2/2020 | |
| JP | 2020089987 A | * | 6/2020 | |
| JP | 2020117587 A | * | 8/2020 | B41F 31/02 |
| JP | 6869664 B2 | * | 5/2021 | B41J 2/01 |
| KR | 20170109683 | * | 9/2017 | G06F 3/041 |
| WO | WO-02053383 A2 | * | 7/2002 | B41J 11/002 |
| WO | WO2008/047620 A1 | | 4/2008 | |
| WO | WO2016/021658 A1 | | 2/2016 | |
| WO | WO-2018030027 A1 | * | 2/2018 | B41J 2/01 |
| WO | WO-2018165068 A1 | * | 9/2018 | B41J 11/002 |

\* cited by examiner

ACTIVE ENERGY RAY CURING COMPOSITION, ACTIVE ENERGY RAY CURING INK COMPOSITION, ACTIVE ENERGY RAY CURING INKJET INK COMPOSITION, CONTAINER, IMAGE FORMING DEVICE, IMAGE FORMING METHOD, AND CURED MATTER

CROSS-REFERENCE TO RELATED APPLICATIONS

This patent application is based on and claims priority pursuant to 35 U.S.C. § 119 to Japanese Patent Application Nos. 2021-111640 and 2022-080782, filed on Jul. 5, 2021 and May 17, 2022, respectively, in the Japan Patent Office, the entire disclosures of which are hereby incorporated by reference herein.

BACKGROUND

Technical Field

The present disclosure relates to an active energy ray curing composition, an active energy ray curing ink composition, an active energy ray curing inkjet ink composition, a container, an image forming device, an image forming method, and cured matter.

Description of the Related Art

Since an inkjet printing method among many printing methods produces images readily and inexpensively, the method is applicable to a variety of printing fields.

In the printing business, using ultraviolet ray curing inks has been proposed which dries or cures instantly at an exposure to light. A specific example among them is an active energy ray curing composition containing a radical reactive compound or radical monomer and a photoradical initiator.

Active energy ray curing compositions, which cure at an exposure to active energy rays, dry faster than solvent-based ink compositions, and are required to firmly attach to many types of substrates.

SUMMARY

According to embodiments of the present disclosure, an active energy ray curing composition applied to cured matter of a first active energy ray curing composition is provided, which contains a second active energy ray curing composition containing a monofunctional monomer, a polyfunctional monomer, and a photopolymerization initiator, wherein the proportion of the polyfunctional monomer to the second active energy ray composition is 60 percent by mass or more, the proportion of the polyfunctional monomer modified with the same number of an oxyalkylene group as the number of functional groups of the polyfunctional monomer is 90 percent by mass of the polyfunctional monomer, and the proportion of a tri- or higher poly functional monomer is 50 percent by mass or more to the modified polyfunctional monomer As another aspect of embodiments of the present disclosure, an image forming method is provided which includes applying an active energy ray curing composition to cured matter of a first active energy ray curing composition, the active energy ray curing composition containing a second active energy ray curing composition containing monofunctional monomer, a polyfunctional monomer, and a photopolymerization initiator, wherein the proportion of the polyfunctional monomer to the second active energy ray composition is 60 percent by mass or more, a polyfunctional monomer modified with the same number of an oxyalkylene group as the number of functional groups of the polyfunctional monomer accounts for 90 percent by mass or more of the polyfunctional monomer, and a tri- or higher polyfunctional monomer accounts for 50 percent by mass or more of the polyfunctional monomer modified with the same number of an oxyalkylene group.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
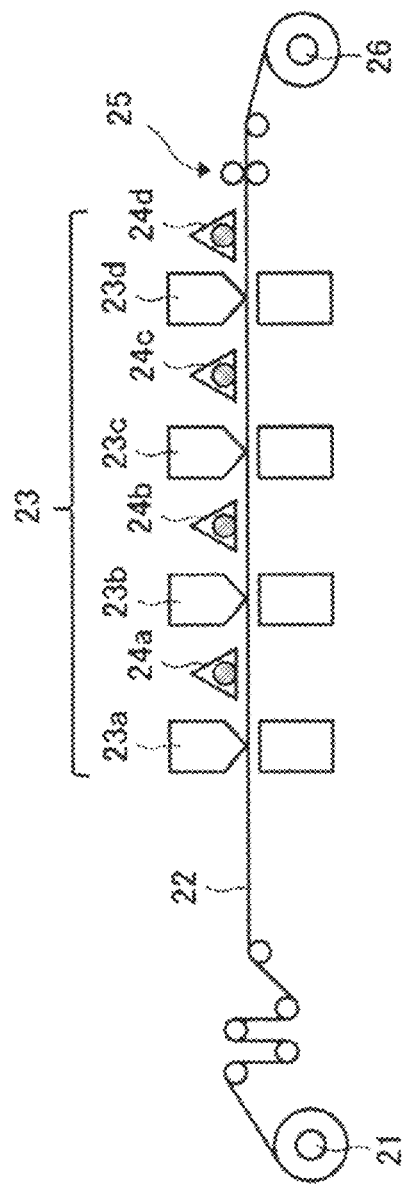
FIG. 1 is a schematic diagram illustrating an example of an image forming device according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Active energy ray curing compositions involve a trade-off between the attachability to many types of substrates and fastness. In an attempt to solve this problem, liquid is applied onto printed matter to enhance the fastness; however, the overcoat liquid penetrates the printed matter because the matter has a low fastness. In addition, the film becomes brittle if the fastness on the overcoat side is enhanced.

According to the present disclosure, an active energy ray curing composition is provided which can strike a balance between the attachability to many types of substrates and the fastness of cured matter.

The active energy ray curing composition, which is applied to cured matter of a first active energy ray curing composition, contains a second active energy ray curing composition. The second active energy ray curing composition contains a monofunctional monomer, a polyfunctional monomer, and a photopolymerization initiator.

The proportion of the polyfunctional monomer to the second active energy ray curing composition is 60 percent by mass or more. A polyfunctional monomer modified with the same number of an oxyalkylene group as the number of functional groups of the polyfunctional monomer accounts for 90 percent by mass or more of the polyfunctional monomer and a tri- or higher polyfunctional monomer accounts for 50 percent by mass or more of the modified poly functional monomer.

In the present disclosure, the number of functional groups and the number of oxyalkylene functional groups are the same when the polyfunctional monomer is modified with an oxyalkylene group. The number of oxyalkylene groups is a multiple of the number of functional groups when a polyoxyelkylene group modifies a polyfunctional monomer.

Second Active Energy Ray Curing Composition

The monofunctional monomer and the polyfunctional monomer of the second active energy ray curing composition of the present disclosure are described below.

Monofunctional Monomer

The monofunctional monomer can be any known monofunctional monomer and be used alone or in combination.

Polyfunctional Monomer

The polyfunctional monomer can be any known polyfunctional monomer and be used alone or in combination.

The polyfunctional monomer modified with the same number of an oxyalkylene group as the number of functional groups in the second polyfunctional monomer can be any known polyfunctional monomer. The modified monomer can be used alone or in combination. Specific examples include, but are not limited to, the compounds represented by the following Chemical Structures A-1 to A-7.

(A-1)

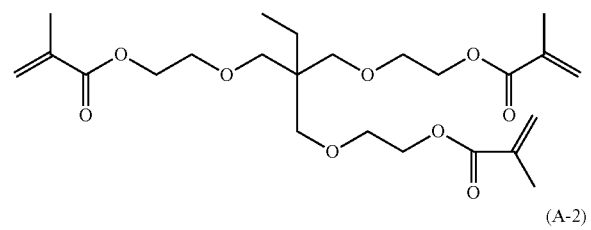

(A-2)

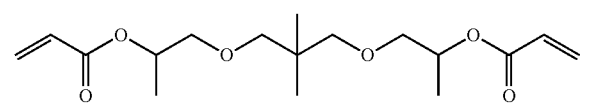

-continued (A-4)

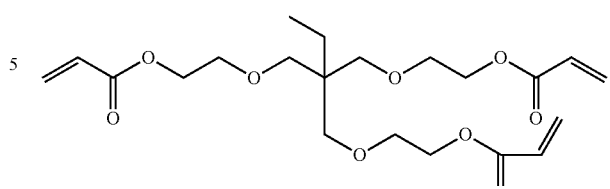

(A-3)

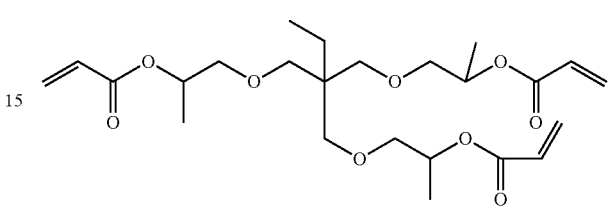

(A-5)

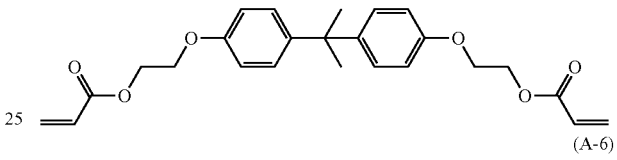

(A-6)

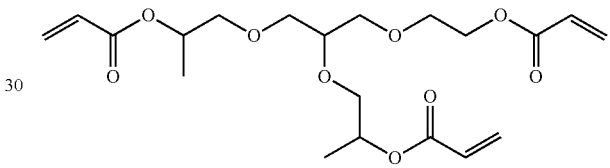

(A-7)

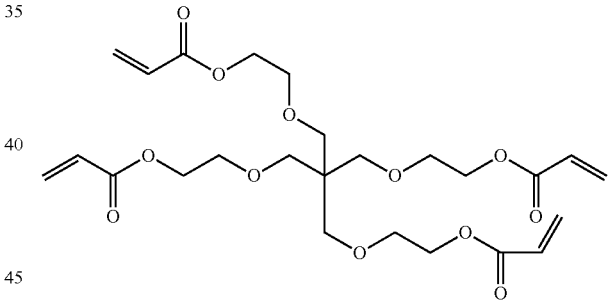

The proportion of the polyfunctional monomer to the second active energy ray curing composition of the present disclosure is 60 percent by mass or more. The proportion of the monomer modified with oxyalkylene group having the same number of functional groups as the functional groups of the polyfunctional monomer in the polyfunctional monomer is 90 percent by mass or more and the proportion of tri- or higher polyfunctional monomer to the modified polyfunctional monomer is 50 percent by mass or more. The film becomes stiff and brittle when the polyfunctional monomer is not modified with an oxyalkylene group. On the other hand, the film becomes too soft and fails to achieve required strength when the modification number of oxyalkylene group is more than the number of functional groups.

When the proportion of the polyfunctional monomer is less than 60 percent by mass, the film becomes weak. When the proportion of the polyfunctional monomer having a tri- or higher functional group is less than 50 percent by mass, the film becomes weak as well, which is not preferable.

First Active Energy Ray Curing Composition

The first active energy ray curing composition of the present disclosure is not particularly limited as long as its cured matter or product firmly attaches to a substrate. The first active energy ray curing composition may contain a monofunctional monomer, a poly functional monomer, a photopolymerization initiator.

The monofunctional monomer and the polyfunctional monomer of the first active energy ray curing composition can be the same as the monofunctional monomer and polyfunctional monomer of the second active energy ray curing composition. The first active energy ray curing composition preferably contains a certain amount of a polyfunctional monomer that forms a cross-linking structure to prevent the second active energy ray curing composition from penetrating the first active energy ray curing composition when the second is applied to cured matter of the first. The proportion of the monofunctional monomer of the first active energy ray curing composition to the first active energy ray curing composition is preferably about 60 percent by mass and more preferably 85 percent by mass or more while the proportion of the polyfunctional or more while the proportion of the polyfunctional monomer in the first active energy ray curing composition is preferably from about 5 to 20 about percent by mass.

The first active energy ray curing composition preferably contains a polyester resin having an unsaturated bond, a polymerizable tree-like branched compound, and an allophanate-bond-containing compound.

The polyester resin, the polymerizable tree-like branched compound, and the allophanate-bond-containing compound are described below.

Polyester Resin Having Unsaturated Bond

The polyester resin having an unsaturated bond of the present disclosure preferably has an unsaturated group derived from a non-acrylic group. Examples of the unsaturated bond include, but are not limited to, vinyl group and allyl group.

The polyester resin preferably has a number average molecular weight of 3,000 or less. A number average molecular weight above 3,000 may degrade the discharging stability of inkjetting.

The proportion of the polyester resin in the entire composition is preferably from 5.0 to 20.0 percent by mass. A proportion less than 5.0 percent by mass fails to achieve good substrate attachability. Conversely, a proportion surpassing 20.0 percent by mass may degrade the discharging stability.

This polyester resin preferably contains a polyester resin having a polymerizable unsaturated bond. The polyester resin having a polymerizable unsaturated bond copolymerizes with a polymerizable compound, which inferentially leads to strong attachability with a substrate.

The polyester resin having a polymerizable unsaturated bond of the present disclosure preferably has an unsaturated group derived from non-(meth)acryloyl group. Examples of the unsaturated group other than (meta)acryloyl include, but are not limited to, vinyl and allyl.

Specific examples of the polyester resin having a polymerizable unsaturated bond include, but a not limited to, UVAD-081 and UVAD-085, both manufactured by OSAKA SODA CO., LTD.

The number average molecular weight of the polyester resin preferably 3,000 or less. A number average molecular weight of 3,000 or less prevents degradation of discharging stability of inkjetting. The lower limit of the number average molecular weight is, for example, about 500.

The proportion of the polyester resin to the entire composition is preferably from 5.0 to less than 20.0 percent by mass and more preferably from 10.0 to 15.0 percent by mass. A proportion of the polyester resin at 5.0 percent by mass or more achieves sufficient attachability to a substrate. A proportion of the polyester resin at 20.0 percent by mass or less prevents the degradation of discharging stability.

Polymerizable Tree-Like Branched Compound

The polymerizable tree-like branched compound in the present disclosure preferably has a dendrimer structure or hyper-ranched structure. Since a polymerizable compound having a dendrimer or hyper-branched structure actively develops a three-dimensional structure due to the radiant structure peculiar to the compound, obtained cured matter has a high cross-linking density, achieving a strong applied film.

If this polymerizable compound has an average polymerizable functional groups of six or more, it achieves a high cross-linking density.

Also, this compound can efficiently relax the inner or outer stress due to its peculiar steric structure compared with an ordinary straight-chain polymerizable compound. So it can reduce the adverse impact on the attachability to a substrate.

The polymerizable tree-like branched compound preferably has a dendrimer or hyper-branched structure having at least an acryloyloxy or methacryloyloxy group at its terminal. Alternatively, the polymerizable tree-like branched compound preferably has six or more radical polymerizable functional groups of an acryloyloxy or methacryloyloxy group and a dendrimer or hyper-ranched structure in its molecule.

The hyper-branched structure means a multi-branched polymer synthesized due to self-condensation of a compound having two types of substitution groups reactive with each other in one molecule. The sum of substitution groups is three or more. The dendrimer structure means a multi-branched polymer in which branched molecule structures each forming the base unit repeatedly bond each other from the polyfunctional compound constituting the center of the molecular structure referred to as the core molecule.

The proportion of the polymerizable tree-like branched compound in the entire composition is preferably from 4.0 to 25.0 percent by mass. A proportion of 4.0 percent by mass or more achieves a strong film. A proportion of 25.0 percent by mass or less minimizes the shrinkage caused by curing, thereby keeping the attachability.

Radical polymerizable compounds having a dendrimer or hyper-branched structure can be synthesized or procured. One of the synthesizing methods is as follows.

The hyper branched structure is obtained due to self-condensation of ABx type molecule having two types of substitution groups in a single molecule. The number of substitution groups is at least three in total. It is possible to obtain a hyper branched polyester from 3,5-dihydroxy benzoate as a raw material due to polycondensation. This polyester is a hydroxy-terminated polymer, from which a radical polymerizable compound having a hyper branched structure is obtained by working acrylic acid or methacrylic acid on the terminal.

Dendrimers can be synthesized by a divergent method for synthesizing from the core toward the outside, a convergent method for synthesizing from the terminated functional group toward the inside, and a combination of the two. The convergent method involves: firstly coupling 2-(4-hydroxyphenoxyethyl)-acrylate and 5-hydroxy isophothalic acid;

and secondly coupling with trimesic acid to obtain a radical polymerizable compound having a dendrimer structure.

Examples of the polymerizable tree-like branched compound include, but are not limited to, the compounds below.

A specific example having a dendrimer structure is V #1000, manufactured by OSAKA ORGANIC CHEMICAL INDUSTRY LTD. Specific examples having a hyper branch structure include, but are not limited to, CN2302, CN2303, and CN2304, all manufactured by Sartomer Company, and Etercure 6361-100 and Etercure 6363, both manufactured by Eternal Materials Co., Ltd. These can be used alone or in combination.

The composition of the present disclosure may optionally contain a polymerizable compound other than the compound mentioned above. These may be used alone or in combination of two or more thereof.

Allophanate-Bond-Containing Compound

The allophanate-bond-containing compound in the present disclosure is preferably a polymerizable compound having an allophanate-bond. The polymerizable compound has a particular structure, allowing ink cured matter to have excellent attachability to a highly polarized substrate such as glass and metal.

The allophanate bond contains a hydrogen bond, which minimizes thickening attributable to a urethane bond, resulting in production of ink having excellent continuous dischargeability of inkjetting.

The allophanate-bond-containing compound is preferably acryloyloxy or methacryloyloxy group terminated while it has at least an allophanate-bond. It is also preferably a radical polymerizable compound having a radical polymerizable functional group of an acryloyloxy or methacryloyloxy group.

The proportion of the allophanate-bond-containing compound is preferably from 4.0 to 10.0 percent by mass and more preferably from 4.8 to 8.0 percent by mass to the entire composition. It is preferable to contain an allophanate-bond-containing compound in an amount of 4.0 percent by mass or more to form strong film. A proportion of 10.0 percent by mass or less minimizes shrinkage caused by curing, which prevents the degradation of attachability.

The allophanate-bond-containing compound can be synthesized and procured.

Specific examples of the procured compound include, but are not limited to, the compounds below:

EBECRYL 4666; EBECRYL 4738; and EBECRYL 4740, all manufactured by DAICEL-ALLNEX LTD. These can be used alone or in combination.

Curing Device

The device for curing the curing composition of the present disclosure utilizes heat or active energy rays. Of these, the latter is preferable.

The active energy ray for use in curing the active energy ray curing composition is not particularly limited as long as it applies energy required to allow the polymerization reaction of the polymerizable components in the curing composition. Specific examples include, but are not limited to, electron beams, α rays, β rays, γ rays, and X rays, in addition to ultraviolet rays. In an embodiment in which a particularly high energy light source is used, it obviates the need for a polymerization initiator used for polymerization reaction. In addition, mercury-free is strongly preferable to protect environment when ultraviolet irradiation is used. Using a GaN-based semiconductor ultraviolet light-emitting device is excellent from industrial and environmental points of view. Furthermore, ultraviolet light-emitting diodes (UV-LED) and ultraviolet laser diodes (UV-LD) are preferable as ultraviolet light sources because they have small sizes, long working life, and high efficiency, and enjoy high cost performance.

Polymerization Initiator

The active energy ray curing composition of the present disclosure may contain a polymerization initiator. The polymerization initiator is not particularly limited as long as it produces active species such as a radical or a cation upon an application of energy of active energy radiation to initiate polymerization of a polymerizable compound (monomer or oligomer). The polymerization initiator can be a known radical polymerization initiator, a cation polymerization initiator, a base producing agent, or a combination thereof. Of these, radical polymerization initiators are preferable. Moreover, the polymerization initiator preferably accounts for 5 to 20 percent by mass of the entire (100 percent by mass) of a composition to achieve a sufficient curing speed.

Specific examples of the radical polymerization initiators include, but are not limited to, aromatic ketones, acylphosphineoxide compounds, aromatic oniumchlorides, organic peroxides, thio compounds such as thioxanthone compounds, compounds including thiophenyl groups, hexaarylbiimidazole compounds, ketoxime-esterified compounds, borate compounds, azinium compounds, metallocene compounds, active ester compounds, compounds having a carbon halogen bond, and alkylamine compounds.

In addition, a polymerization accelerator or sensitizer can be optionally used together with the polymerization initiator. The polymerization accelerator is not particularly limited. Preferred examples include, but are not limited to, amine compounds such as trimethylamine, methyldimethanolamine, triethanolamine, p-diethvlaminoacetophenone, p-dimethylaminoethylbenzoate, p-dimethyl aminobenzoate-2-ethylhexyl, N,N-dimthylbenzylamine, and 4,4'-bis(diethylamino)benzophenone. The content can be suitably determined to suit to the type and content of the polymerization initiator used in combination with the polymerization accelerator.

Coloring Material

The active energy ray curing composition of the present disclosure may contain a coloring material. Pigments and dyes can be added as the coloring material in accordance with the objectives and requisites of the composition of the present disclosure. These demonstrate black, white, magenta, cyan, yellow, green, orange, and gloss color such as gold and silver. The proportion of the coloring agent is not particularly limited and determined considering the desired color density and dispersibility of the coloring agent in the curing composition. Preferably, the proportion of the coloring agent accounts for 0.1 to 20 percent by mass of the entire (100 percent by weight) of the composition. The active energy ray curing composition of the present disclosure can be clear and colorless without containing a coloring agent. If no coloring agent is present in a curing composition, the composition is suitable as an overcoat layer for protecting an image.

An inorganic or organic pigment can be used alone or in combination as the pigment.

Specific examples of the inorganic pigment include, but are not limited to, carbon blacks (C.I. PIGMENT BLACK 7) such as furnace black, lamp black, acetylene black, and channel black, iron oxides, and titanium oxides.

Specific examples of the organic pigment include, but are not limited to, azo pigments such as insoluble azo pigments, condensed azo pigments, azo lakes, chelate azo pigments, polycyclic pigments such as phthalocyanine pigments, perylene pigments, perinone pigments, anthraquinone pigments, quinacridone pigments, dioxazine pigments, thioindigo pigments, isoindolinone pigments, and quinofuranone pigments, dye chelates such as basic dye type chelates, acid dye type chelates, dye lakes such as basic dye type lake and acid dye type lake, nitro pigments, nitroso pigments, aniline black, and daylight fluorescent pigments.

In addition, a dispersant is optionally added to enhance dispersibility of a pigment. The dispersant has no particular limit. For example, it is suitable to use a polymer dispersant conventionally used to prepare a pigment dispersion.

The dye includes, for example, an acidic dye, direct dye, reactive dye, basic dye, and a combination thereof.

Organic Solvent

The active energy ray curing composition of the present disclosure optionally contains an organic solvent, although it is preferable to spare it. A composition free of an organic solvent, in particular a volatile organic compound (VOC), is preferable because it enhances safeness at places where the composition is handled, thereby preventing the environment contamination. The organic solvent represents a non-reactive organic solvent such as ether, ketone, xylene, ethylacetate, cyclohexanone, or toluene, which is clearly distinguished from a reactive monomer. Furthermore, "free of" an organic solvent means that no organic solvent is substantially contained. The proportion thereof is preferably less than 0.1 percent by mass.

Other Components

The active energy ray curing composition of the present disclosure may optionally contain other known components. The other components are not particularly limited. Examples are known articles such as surfactants, polymerization inhibitors, leveling agents, defoaming agents, fluorescent brighteners, penetration-enhancing agents, wetting agents (humectants), fixing agents, viscosity stabilizers, fungicide, preservatives, antioxidants, ultraviolet absorbents, chelate agents, pH regulator, and thickeners.

Preparation of Active Energy Ray Curing Composition

The active energy ray curing composition of the present disclosure can be prepared by using the components described above. The preparation devices and conditions are not particularly limited.

For example, the curing composition can be prepared by charging a polymerizable monomer, a pigment, a dispersant, etc., into a dispersing machine such as a ball mill, kitty mill, a disk mill, a pin mill, and a DYNO-MILL to prepare a pigment liquid dispersion followed by mixing with a polymerizable monomer, an initiator, a polymerization inhibitor, and a surfactant.

Viscosity

The viscosity of the active energy ray curing composition of the present disclosure has no particular limit and it can be adjusted to suit to a particular application and device. For a discharging device that discharges the composition from nozzles, the viscosity thereof is preferably in the range of from 3 to 40 mPa-s, more preferably from 5 to 15 mPa s, and particularly preferably from 6 to 12 mPa-s in the temperature range of from 20 to 65 degrees C. preferably at 25 degrees C.

This viscosity range is preferably met without containing the organic solvent mentioned above. The viscosity can be measured by a cone plate rotary viscometer (VISCOMETER TVE-22 L, manufactured by TOKI SANGYO CO., LTD.) using a cone rotor (1° 34'×R24) at a rate of rotation of 50 rpm at a temperature of hemathermal circulating water in the range of from 20 to 65 degrees C. VISCOMATE VM-150III can be used for the temperature control of the circulating water.

Application Field

The application field of the active energy ray curing composition of the present disclosure is not particularly limited. It can be applied to any field where the active energy ray curing composition is used. The composition is selected to suit to a particular application. Examples include, but are not limited to, a resin for use in molding, a paint, an adhesive, an insulant, a releasing agent, a coating material, a sealing material, resists, and optical materials.

Figure 2:
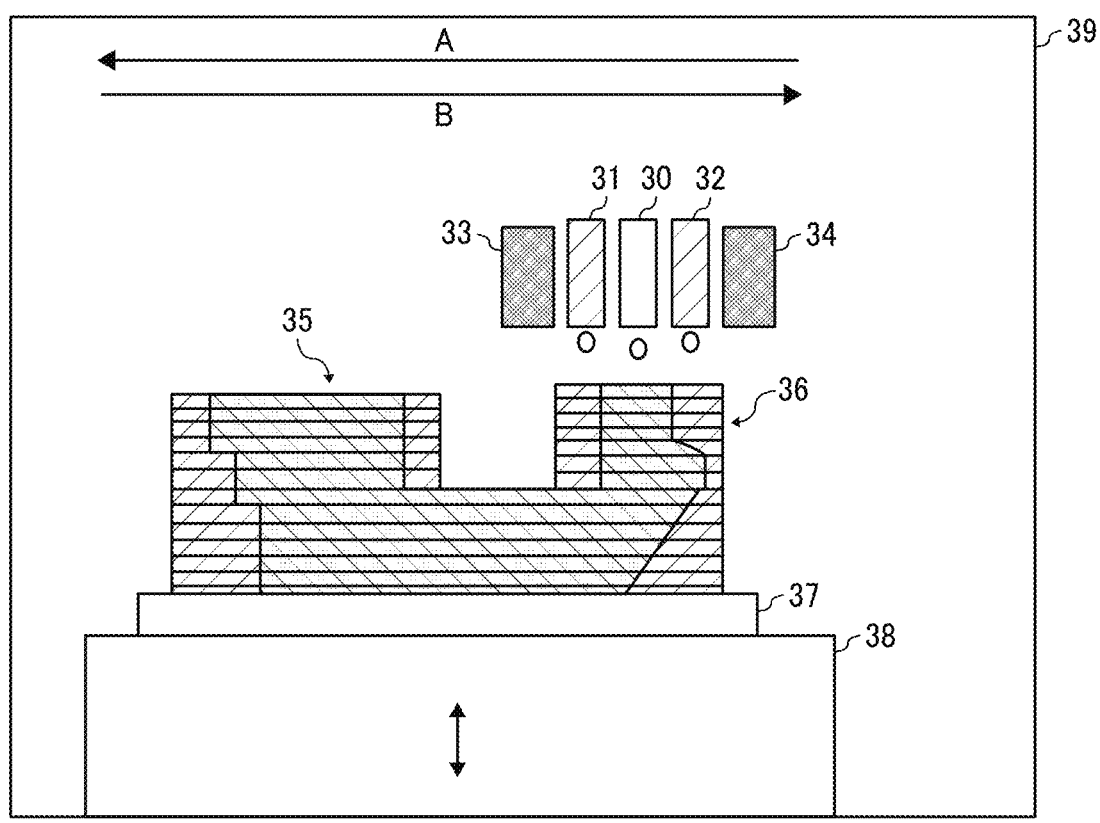
FIG. 2 is a schematic diagram illustrating another example of the image forming device according to an embodiment of the present disclosure.
Figure 3A:
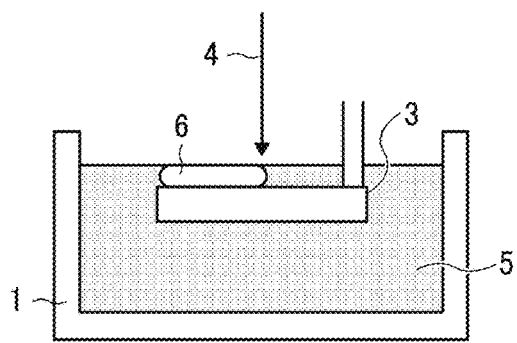
FIGS. 3A. 3B, 3C, and 3D are schematic diagrams illustrating yet another example of the image forming device according to an embodiment of the present disclosure.
Figure 3B:
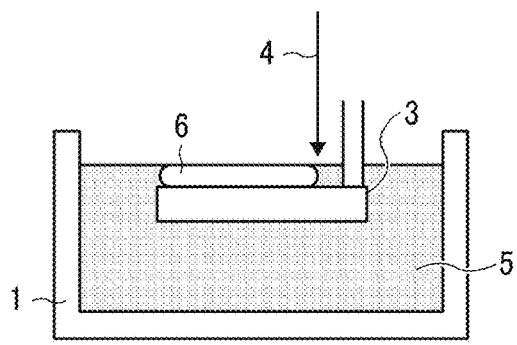
Figure 3C:
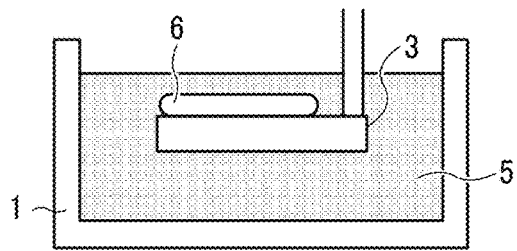
Figure 3D:
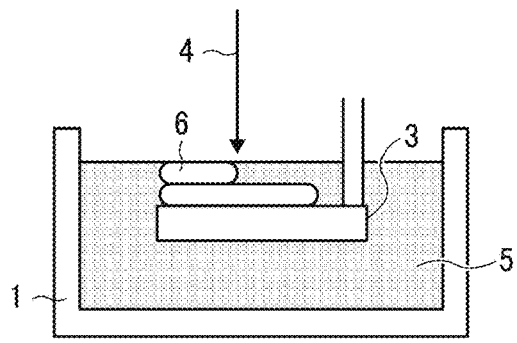

The active energy ray curing composition of the present disclosure can be used as an ink to form two-dimensional texts, images, and designed coating film on various substrates and in addition as a solid object forming material for forming a three-dimensional object. This material for solid freeform fabrication can be used as a binder for powder particles for use in powder additive manufacturing for solid freeform fabrication by repeating curing and laminating powder layers. Also, it can be used as a solid constituting material (modeling material) or supporting member (supporting material) for use in additive manufacturing (stereolithography) method as illustrated in FIG. 2 and FIGS. 3A to 3D. FIG. 2 is a diagram illustrating a method of discharging the active energy ray curing composition of the present disclosure to a particular area followed by curing upon irradiation of active energy ray to form a layer and laminating the layers, the detail of which is described later.

FIGS. 3A to 3D are diagrams illustrating a method of forming a solid freeform fabrication by irradiating a pool (accommodating unit) 1 of the active energy ray curing composition 5 of the present disclosure with active energy ray 4 to form a cured layer 6 having a particular form on a movable stage 3, followed by sequentially laminating the cured layer 6.

Solid freeform fabrication objects can be fabricated with the active energy ray curing composition of the present disclosure using a known device without any particular limitation.

Such a device includes an accommodating unit, a supplying device, and a discharging device, and an active energy ray irradiator of the curing composition.

In addition, the present disclosure includes cured matter obtained by curing the active energy ray curing composition and a mold product obtained by processing a structure formed of a substrate and the cured matter on the substrate. The mold product is obtained by subjecting cured matter or structure having a sheet form or film form to molding process such as hot drawing and punching. The molded product is preferably used for items to be molded after surface decoration. They are gauges or operation panels of products such as vehicles, office machines, electric and electronic machines, and cameras.

The substrate is not particularly limited. It can be suitably selected to suit to a particular application. Substances such as paper, fiber, threads, fabrics, leather, metal, plastic, glass, wood, ceramics, or composite materials thereof can be used. Of these, plastic substrates are preferred in terms of moldability.

Composition Container

The composition container of the present disclosure represents a container containing the active energy ray curing composition and is suitable for the applications as described above. If the active energy ray curing composition of the present disclosure is used for ink, the container containing the ink can be used as an ink cartridge or an ink bottle. Therefore, users can avoid direct contact with the ink during operations such as transfer or replacement of the ink, so that the users can keep the fingers and clothes clean. Furthermore, the ink is not contaminated by foreign matter such as dust. The container can be of any size, any form, and any material. For example, the container can be designed to suit to a particular application. The container is preferably made of a light blocking material or covered with materials such as a light blocking sheet.

The image forming method of the present disclosure may utilize active energy rays, heating, and others.

The image forming method of the present disclosure includes at least exposing the active energy ray curing composition of the present disclosure to active energy rays to cure the active energy ray curing composition.

The image forming device of the present disclosure includes an irradiator for exposing the active energy ray curing composition of the present disclosure to active energy rays and an accommodating unit for containing the curing composition of the present disclosure. The accommodating unit may include the composition container mentioned above. Furthermore, the method and the apparatus may respectively include a discharging step and a discharging device for discharging the active energy ray curing composition. The method of discharging the curing composition is not particularly limited, including a continuous spraying method and an on-demand method. The on-demand method includes methods such as a piezo method, a thermal method, and an electrostatic method.

FIG. 1 is a diagram illustrating an image forming device including an inkjet discharging device. Printing units 23a, 23b, 23c, and 23d each have an ink cartridge and a discharging head respectively for yellow, magenta, cyan, and black active energy ray curable inks. They discharge the inks onto a substrate (recording medium) 22 fed from a supplying roll 21. Thereafter, light sources (irradiators) 24a. 24b, 24c, and 24d emit active energy rays to the inks to cure them, thereby forming a color image. Thereafter, the substrate 22 is conveyed to a processing unit 25 and a printed matter reeling roll 26. Each of the printing units 23a. 23b, 23c, and 23d may include a heating assembly for liquidizing the ink at the ink discharging unit. Moreover, a mechanism may be optionally disposed, which cools down the recording medium to an ambient temperature in a contact or non-contact manner. One of the inkjet recording methods is a serial method including discharging an ink onto a recording medium that incessantly moves in accordance with the width of a discharging head while moving the head. Another way is a line method including discharging an ink onto a recording medium that continuously moves from a discharging head fixed at a particular position.

The substrate 22 is not particularly limited. Specific examples include, but are not limited to, paper, film, ceramics, glass, metal, or complex materials thereof. The substrate 22 may take a sheet form but is not limited thereto. The image forming device may have a simplex printing configuration capable of printing on one side of a substrate or a duplex printing configuration capable of printing on both sides thereof. The substrate is not limited to a common recording medium. The following is also suitable: corrugated cardboard, building materials such as wall paper and floor material, cloth for apparel such as T-shirts, textile, and leather.

In addition, after an image is printed with multiple colors with no or faint active energy radiation from the light sources 24a, 24b, and 24c, the light source 24d exposes the image to active energy radiation. This configuration saves energy and cost. The print matter printed with the ink of the present disclosure includes items having printed text or images on a plain surface of a medium including conventional paper and resin film, items having printed text or images on a rough surface, and items having printed text or images on a surface made of various materials such as metal or ceramic. It is possible to form an image partially with solid feeling (formed of two-dimensional images partially with three-dimensional images) or a solid object by laminating two dimensional images.

FIG. 2 is a schematic diagram illustrating another example of the image forming device (device for fabricating a three-dimensional image) of the present disclosure. An image forming device 39 illustrated in FIG. 2 stacks layers by: discharging the first active energy ray curing composition from a discharging head unit 30 for fabrication and a second active energy ray curing composition composed of different ingredients from that of the first active energy ray curing composition from discharging head units 31 and 32 for a support by using a head unit having inkjet heads disposed movable in the directions indicated by the arrows A and B; curing each composition with ultraviolet irradiators 33 and 34 disposed adjacent to the discharging head units 31 and 32 respectively; and repeating the discharging and the curing. For example, the discharging head units 31 and 32 for a support discharge the second active energy curing composition onto a substrate 37 for fabrication. The second active energy curing composition is solidified at exposure to active energy radiation, thereby forming a first support layer having a hollow space (pool) for fabrication. The discharging head unit 30 for fabrication discharges the first active energy curing composition onto the hollow space followed by exposure to active energy radiation for solidification, which forms a first fabrication layer. This step is repeated multiple times in accordance with the required number of lamination while moving the stage 38 up and down in the vertical direction to laminate the support layer and the fabrication layer. A solid freeform fabrication object 35 is thus created. Thereafter, a laminated support 36 is removed, if desired. Although there is only one of the discharging head unit 30 for fabrication illustrated in FIG. 2, the device may have two or more discharging head units 30.

The terms of image forming, recording, and printing in the present disclosure represent the same meaning.

Also, recording media, media, and print substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

The present disclosure is more detailed below but the scope of the technology is not limited to the following Examples.

The abbreviations of the materials and components used in Examples and Comparative Examples are described in Table 1 below.

TABLE 1

| Abbreviation or product name | Component category | Compound name and manufacturer |
|---|---|---|
| THFA | Monofunctional monomer | Tetrahydrofurfurylacrylate, manufactured by OSAKA ORGANIC CHEMICAL INDUSTRY LTD. |
| IBXA | | Isobornyl acrylate, manufactured by OSAKA ORGANIC CHEMICAL INDUSTRY LTD |
| PEA | | Phenoxyethyl acrylate, manufactured by OSAKA ORGANIC CHEMICAL INDUSTRY LTD. |
| FA511AS | | Dicyclopentenyl acrylate, manufactured by Hitachi Chemical Co., Ltd.) |
| Ebecryl 4666 | Polyfunctional monomer, oligomer | Allophanate-bond-containing urethane acrylate,tri-functional, manufactured by DAICEL-ALLNEX LTD. |
| Etercure 6361-100 | | Polyester acrylate having Hyper branch structure, manufactured by Eternal Materials Co., Ltd. |
| Aronix M-310 | Polyfunctional monomer, number of oxyalkylene group = number of functional groups | Po-modified trimethylol propane triacrylate, manufactured by TOAGOSEI CO., LTD. |
| Aronix M-350 | | Eo-modified trimethylol propane triacrylate, manufactured by TOAGOSEI CO., LTD. |
| SR9003 | | Propoxylated neopentyl glycol diacrylate, manufactured by Sartomer Company |
| SR494 | | Ethoxylated (4) pentaerythritol tetraacrylate, manufactured by Sartomer Company |
| Aronix M-309 | Other polyfunctional monomer | Trimethylol propane triacrylate, manufactured by TOAGOSEI CO., LTD. |
| Aronix M-360 | | Eo-modified trimethylol propane triacrylate, manufactured by TOAGOSEI CO., LTD. |
| DAIDO UV-CURE APO | | Manufactured by Daido Chemical Industry Co., Ltd. |
| Ominrad 907 | Photopolymerization initiator | Manufactured by IGM Resins B.V. |
| Ominrad 819 | | Manufactured by IGM Resins B.V. |
| UVAD-081 | Polyester resin having polymerizable unsaturated bond | Manufactured by OSAKA SODA CO., LTD |
| UVAD-085 | | Manufactured by OSAKA SODA CO., LTD. |
| BHT | Polymerization inhibitor | Dibutyl hydroxy toluene, manufactured by Seiko Chemical Co., Ltd. |
| Methoquinone | | P-methoxy phenol, manufactured by Seiko Chemical Co., Ltd. |
| CB | Coloring material | MICROLITH Black C-K, carbon black pigment, manufactured by BASF Japan Ltd. |
| Blue | | MICROLITH Blue 4G-K, manufactured by BASF Japan Ltd. |

Examples 1 to 7 and Comparative Examples 1 to 3

Preparation of Active Energy Ray Curing Composition

According to the materials and the proportion in percent by mass shown in Table 2, active energy ray curing compositions of Examples and Comparative Examples were prepared by a usual method. The sign representing each compound in Table 2 is the same as that of the compound shown in Table 1.

Each active energy ray curing composition of Examples and Comparative Examples was applied to each substrate of PET film, E5100, a thickness of 100 μm, slide glass, and steel plate to form film of a thickness of 10 μm. The film was caused to cure by a metal halide lamp at 4000 mJ/cm$^2$, manufactured by USHIO INC.

Appearance, attachability, and pencil hardness of the film was evaluated according to the following method. The evaluation results are shown in Table 2.

Appearance

After the second active energy ray curing composition was applied onto the cured first active energy ray curing composition, whether the cured matter was eroded was determined by the appearance. No represents not eroded and Yes represents eroded.

Attachability

The attachability to a substrate was evaluated according to the cross cut method and the evaluation criterion of JIS K5600-5-6 format. The criterion has six grades scaling from 0 to 5, with 0 being most excellent. Grade 2 or above is determined as usable for practical purpose. The results are shown in Table 1.

Pencil Hardness

The film was tested about pencil hardness according to scratch hardness of pencil method of JIS K5600-5-4 format. The results are shown in Table 1.

Ink Dischargeability as Inkjet Ink

Three types of inkjet ink formed of the active energy ray curing compositions of Examples 1 to 3 were evaluated regarding curability and ink dischargeability.

Evaluation Method

Nozzle check patterns were printed using ink to check defective or abnormal discharging including non-discharging and shifted discharging. For each nozzle check pattern, the dot omission and disturbed discharging were visually checked.

Evaluation Criteria
  A: No defective discharging
  B: Slight defective discharging
  C: Nozzles with abnormal discharging present
  D: Many nozzles with significantly abnormal discharging including non-discharging nozzles The evaluation results were A for all the ink-jet inks.

TABLE 2

| | | | Example No. | | | | |
|---|---|---|---|---|---|---|---|
| Component | | | 1 | 2 | 3 | 4 | 5 |
| First curing composition | Monofunctional monomer | THFA | | | | 42 | |
| | | IBXA | | | | 24 | |
| | | PEA | | | | | |
| | | FA511AS | | | | | |
| | Polyfunctional monomer, oligomer | Ebecryl 4666 | | | | 11 | |
| | | Etercure 6361-100 | | | | | |
| | Other polyfunctional monomer | Aronix M-360 | | | | | |

TABLE 2-continued

| | | | | | | | |
|---|---|---|---|---|---|---|---|
| | Photopolymerization initiator | DAIDO UV-CURE APO | | | 7.9 | | |
| | | Ominrad 907 | | | | | |
| | | Ominrad 819 | | | | | |
| | Polyester resin having polymerizable unsaturated bond | UVAD-081 | | | 12 | | |
| | | UVAD-085 | | | | | |
| | Polymerization inhibitor | BHT | | | 0.1 | | |
| | | Methoquinone | | | | | |
| | Coloring material | CB | | | 3 | | |
| | | Blue | | | | | |
| Second curing composition | Monofunctional monomer | THFA | 28 | 28 | 30 | | 20 |
| | | IBXA | | | | 29 | 12 |
| | Polyfunctional monomer A, number of alkoxy group = number of functional groups | Aronix M-310 | 65 | | | | |
| | | Aronix M-350 | | 65 | 60 | 50 | |
| | | SR9003 | | | | 15 | |
| | | SR494 | | | | | 54 |
| | Polyfunctional monomer B, others | Aronix M-309 | | | | | |
| | | Aronix M-360 | | | | | 6 |
| | Photopolymerization initiator | DAIDO UV-CURE APO | | | 9.9 | 4 | 7.8 |
| | | Ominrad 907 | 6.9 | 6.9 | | | |
| | | Ominrad 819 | | | | 1 | |
| | Polymerization inhibitor | BHT | 0.1 | 0.1 | | 1 | 0.2 |
| | | Methoquinone | | | 0.1 | | |
| | Polyfunctional (A + B)/Entire monomer | | 0.70 | 0.70 | 0.67 | 0.69 | 0.65 |
| | Poly functional A/Polyfunctional (A + B) | | 1.00 | 1.00 | 1.00 | 1.00 | 0.90 |
| Evaluation | Appearance | | No | No | No | No | No |
| | Attachability, type of substrate | PET | 2 | 2 | 2 | 1 | 1 |
| | | Glass | 1 | 1 | 2 | 1 | 1 |
| | | Steel | 1 | 1 | 1 | 1 | 0 |
| | Pencil hardness | | F | HB | H | F | HB |

| | | | Example No. | | Comparative Example No. | | |
|---|---|---|---|---|---|---|---|
| Component | | | 6 | 7 | 1 | 2 | 3 |
| First curing composition | Monofunctional monomer | THFA | 41 | | | 42 | |
| | | IBXA | 22 | | | 24 | |
| | | PEA | | 36 | | | |
| | | FA511AS | | 26 | | | |
| | Polyfunctional monomer, oligomer | Ebecryl 4666 | 8 | | | 11 | |
| | | Etercure 6361-100 | | 15 | | | |
| | Other polyfunctional monomer | Aronix M-360 | 4 | | | | |
| | Photopolymerization initiator | DAIDO UV-CURE APO | 7.9 | | | 7.9 | |
| | | Ominrad 907 | | 8 | | | |
| | | Ominrad 819 | | 2 | | | |
| | Polyester resin having polymerizable unsaturated bond | UVAD-081 | 12 | | | 12 | |
| | | UVAD-085 | | 8 | | | |
| | Polymerization inhibitor | BHT | 0.1 | | | 0.1 | |
| | | Methoquinone | | 1 | | | |
| | Coloring material | CB | | 4 | | 3 | |
| | | Blue | | 5 | | | |
| Second curing composition | Monofunctional monomer | THFA | 28 | 28 | 65 | 28 | 28 |
| | | IBXA | | | | | |
| | Polyfunctional monomer A, number of alkoxy group = number of functional groups | Aronix M-310 | | | | | |
| | | Aronix M-350 | 65 | 65 | 28 | | |
| | | SR9003 | | | | | |
| | | SR494 | | | | | |
| | Polyfunctional monomer B, others | Aronix M-309 | | | | 65 | |
| | | Aronix M-360 | | | | | 65 |
| | Photopolymerization initiator | DAIDO UV-CURE APO | | | | | |
| | | Ominrad 907 | 6.9 | 6.9 | 6.9 | 6.9 | 6.9 |
| | | Ominrad 819 | | | | | |

TABLE 2-continued

|  |  |  |  |  |  |  |  |
|---|---|---|---|---|---|---|---|
|  | Polymerization inhibitor | BHT Methoquinone | 0.1 | 0.1 | 0.1 | 0.1 | 0.1 |
|  | Polyfunctional (A + B)/Entire monomer | | 0.70 | 0.70 | 0.30 | 0.70 | 0.70 |
|  | Polyfunctional A/Polyfunctional (A + B) | | 1.00 | 1.00 | 1.00 | 0.00 | 0.00 |
| Evaulation | Appearance | | No | No | Yes | No | No |
|  | Attachability, type of substrate | PET | 2 | 1 | — | 5 | 1 |
|  |  | Glass | 1 | 2 | — | 5 | 0 |
|  |  | Steel | 2 | 2 | — | 5 | 1 |
|  | Pencil hardness | | F | HB | — | 2H | 2B |

As seen in the results shown in Table 2, the active energy ray curing composition of the present disclosure has a pencil hardness of HB or greater and strikes a balance between attachability to PET, glass, or steel and the second active energy ray curing composition not eroding the background. Attachability and pencil hardness were not evaluated if the background was eroded.

The present disclosure relates to the active energy ray curing composition of the following 1 and also includes the following 2 to 10 as embodiments.

1. An active energy ray curing composition applied to cured matter of a first active energy ray curing composition, the active energy ray curing composition contains a second active energy ray curing composition containing a monofunctional monomer, a polyfunctional monomer, and a photopolymerization initiator, wherein the proportion of the polyfunctional monomer to the second active energy ray composition is (A) percent by mass or more, wherein a polyfunctional monomer modified with a same number of an oxyalkylene group as a number of functional groups of the polyfunctional monomer accounts for 90 percent by mass or more of the polyfunctional monomer,
wherein a tri- or higher polyfunctional monomer accounts for 50 percent by mass or more of the polyfunctional monomer modified with a same number of an oxyalkylene group.
2. The active energy ray curing composition according to 1, wherein the first active energy ray curing composition contains a monofunctional monomer, a polyfunctional monomer, a photopolymerization initiator, a polyester resin having an unsaturated bond, and at least one of a polymerizable tree-like branched compound or allophanate-bond-containing compound.
3. The active energy ray curing composition according to 2 mentioned above, wherein the proportion of the monofunctional monomer of the first active energy ray curing composition to the first active energy ray curing composition is 85 percent by mass or more,
4. An active energy ray curing ink composition contains the active energy ray curing composition of any one of 1 to 3 mentioned above.
5. An active energy ray curing inkjet ink composition contains the active energy ray curing ink composition of 4 mentioned above.
6. A container contains the composition of any one of 1 to 5 mentioned above.
7. An image forming device includes an accommodating unit containing the composition of any one of 1 to 5 mentioned above and an irradiator for exposing the composition to active energy radiation.
8. An image forming method includes exposing the composition of any one of 1 to 5 mentioned above to active energy radiation.
9. An image forming method comprising applying the composition of any one of 1 to 5 mentioned above to the cured matter of the first active energy ray curing composition.
10. Cured matter formed by exposing the composition of any one of 1 to 5 mentioned above to active energy radiation.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An image forming method, comprising:
applying a second active energy ray curing composition to a cured matter of a first active energy ray curing composition, the second active energy ray curing composition comprising:
a monofunctional monomer;
a polyfunctional monomer; and
a photopolymerization initiator,
wherein a proportion of the polyfunctional monomer to the second active energy ray composition is 60 percent by mass or more,
wherein a polyfunctional monomer modified with a same number of an oxyalkylene group as a number of functional groups of the polyfunctional monomer accounts for 90 percent by mass or more of the polyfunctional monomer,
wherein a tri- or higher polyfunctional monomer accounts for 50 percent by mass or more of the polyfunctional monomer modified with a same number of an oxyalkylene group, and
wherein the first active energy ray curing composition comprises a monofunctional monomer, a polyfunctional monomer, a photopolymerization initiator, a polyester resin having an unsaturated bond, and at least one of a polymerizable tree-like branched compound or an allophanate-bond-containing compound.

2. The method according to claim 1, wherein a proportion of the monofunctional monomer of the first active energy ray curing composition to the first active energy ray curing composition is 85 percent by mass or more.

3. The method according to claim 1, further comprising:
exposing the second active energy ray curing composition to an active energy ray.

4. The method according to claim 1, wherein the second active energy ray curing composition is contained in a container.

5. The method according to claim 1, which is performed with an image forming device, the image forming device comprising:
- an accommodating unit containing the second active energy ray curing composition; and
- an irradiator configured to expose the second active energy ray curing composition to an active energy ray.

6. An image forming method, comprising:
applying a second active energy ray curing composition to a cured matter of a first active energy ray curing composition, the second active energy ray curing composition comprising:
- a monofunctional monomer;
- a polyfunctional monomer; and
- a photopolymerization initiator, wherein a proportion of the polyfunctional monomer to the second active energy ray composition is 60 percent by mass or more, wherein a polyfunctional monomer modified with a same number of an oxyalkylene group as a number of functional groups of the polyfunctional monomer accounts for 90 percent by mass or more of the polyfunctional monomer, wherein a tri- or higher polyfunctional monomer accounts for 50 percent by mass or more of the polyfunctional monomer modified with a same number of an oxyalkylene group, and wherein a proportion of the monofunctional monomer of the first active energy ray curing composition to the first active energy ray curing composition is 85 percent by mass or more.

7. The method according to claim 6, wherein the second active energy ray curing composition is contained in a container.

8. The method according to claim 6, which is performed with an image forming device, the image forming device comprising:
- an accommodating unit containing the second active energy ray curing composition; and
- an irradiator configured to expose the second active energy ray curing composition to an active energy ray.

* * * * *